United States Patent [19]
Payne

[11] Patent Number: 5,799,404
[45] Date of Patent: *Sep. 1, 1998

[54] LEVEL CLAMP

[76] Inventor: Douglas Payne, P.O. Box 130, Ashland, Mass. 01721

[*] Notice: The term of this patent shall not extend beyond the expiration date of Pat. No. 5,581,900.

[21] Appl. No.: 725,232

[22] Filed: Oct. 3, 1996

Related U.S. Application Data

[63] Continuation-in-part of Ser. No. 453,647, May 30, 1995, Pat. No. 5,581,900.

[51] Int. Cl.⁶ .................. G01C 9/28; F16M 13/02
[52] U.S. Cl. .................. 33/370; 33/372; 248/229.13; 248/229.16
[58] Field of Search .................. 33/370, 371, 372; 248/229.13, 229.16

[56] References Cited

U.S. PATENT DOCUMENTS

| | | |
|---|---|---|
| 1,200,410 | 10/1916 | Chemrinsky . |
| 1,229,916 | 6/1917 | Duncan . |
| 1,940,808 | 12/1933 | Linsert . |
| 2,531,563 | 11/1950 | Feldheim . |
| 2,660,804 | 12/1953 | Mundy . |
| 2,677,192 | 5/1954 | Anderson .................. 33/372 |
| 2,915,273 | 12/1959 | Gavrun, Sr. . |
| 3,230,632 | 1/1966 | Redding . |
| 4,066,232 | 1/1978 | Hermeyer . |
| 4,745,688 | 5/1988 | Jewers .................. 33/372 |
| 4,829,676 | 5/1989 | Waldron .................. 33/372 |
| 5,063,679 | 11/1991 | Schwandt . |
| 5,074,509 | 12/1991 | Van Orden . |
| 5,154,000 | 10/1992 | Mahoney et al. .................. 33/371 |
| 5,581,900 | 12/1996 | Payne .................. 33/372 |

Primary Examiner—Christopher W. Fulton
Attorney, Agent, or Firm—Morse & Altman

[57] ABSTRACT

A clamp for temporarily attaching a level to a construction component including an elongated metal or plastic, inverted U-shaped, one-piece body with an opening in the center of the top wall that extends partway down the side walls through which the level bubble is seen, a pair of pivotally-mounted, spring-loaded, opposed jaws having pins for temporarily gripping the construction component, and micro-catch patches or screws for temporarily attaching the level to the body.

12 Claims, 6 Drawing Sheets

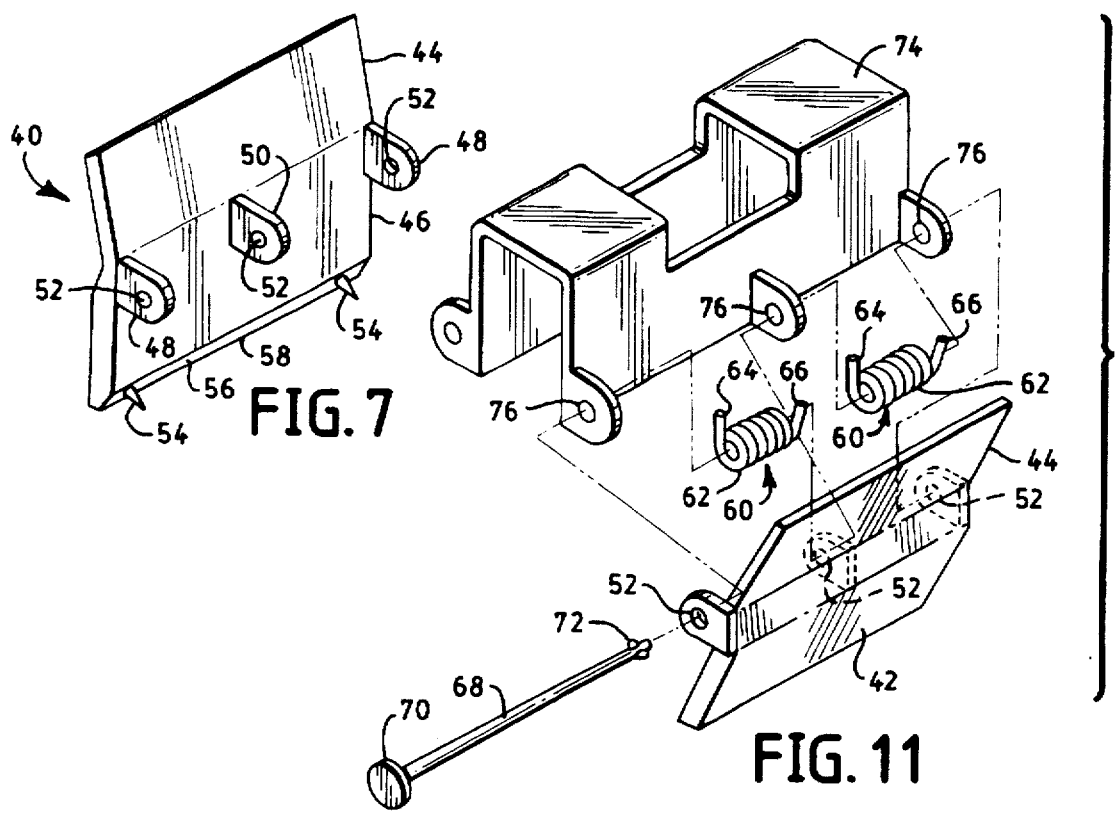
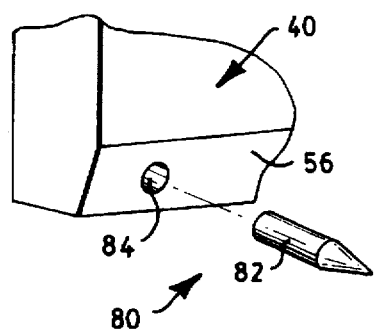
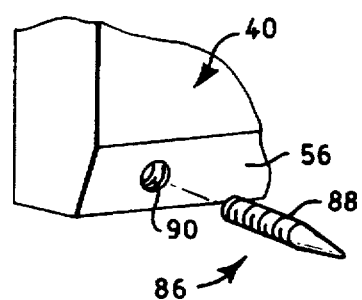
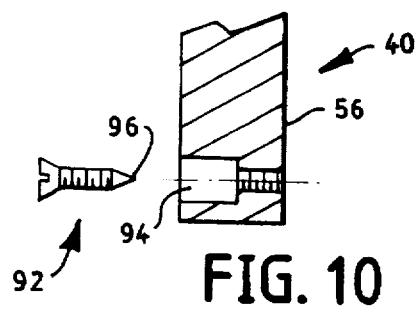

LEVEL CLAMP

RELATED APPLICATIONS

The present application is a continuation-in-part application of application Ser. No. 08/453,647 filed on May 30, 1995 for LEVEL CLAMP in the name of Douglas Payne, now U.S. Pat. No. 5,581,900.

BACKGROUND OF THE INVENTION

1. Field of the Invention

The present invention relates generally to tools for building construction and, more particularly, to clamps for holding levels to beams, studs, door frames, and the like.

2. The Prior Art

In any type of building construction, there are construction components that must be oriented in particular ways. For example, 2×4 wall studs must be vertical, window frames must be horizontal or vertical, ceiling joists must be horizontal, deck posts must be vertical, etc. In order to make sure that these components are oriented properly, the level, a basic tool of the construction trade, is used. The most common type of level is the bubble level. In the bubble level, a sealed vial with a slightly convex wall is nearly completely filled with a liquid. The resulting air bubble shows the orientation of the vial. When the vial is in a horizontal position, the bubble is located in the center of the vial. As the vial is moved from the horizontal position, the bubble moves from the center toward one of the ends, indicating that the vial is no longer horizontal.

In order to put the vial to practical use, it is generally mounted in a frame, two forms of which are most common, the box and the I-beam. As their names imply, the box is a three-dimensional rectangular box and the I-beam has the shape of an I in cross-section. The combination of a vial and a box frame is called a box level and the combination of a vial and an I-beam frame is called an I-beam level. The orientation of the vial in the frame depends on the use to which the level is being put. If the level is being used to test the horizontal orientation of a component, the vial is mounted parallel to the reference side of the frame. Thus, when the frame is horizontal or "level", as it is called in the construction trade, the vial is also horizontal, with the bubble centered in the vial. If the level is being used to test the vertical orientation of a component, the vial is mounted perpendicular to the reference side, so that when the reference side is vertical or "plumb", the vial is horizontal, with the bubble centered in the vial. In some special cases, a vial is mounted at an angle other than horizontal or vertical, for example, at 45° from the reference side. Most levels are made with a combination of horizontal and vertical vials.

As stated previously, the level is used to determine whether a construction component is oriented properly prior to permanently securing the component to the larger construct. To use the level, the reference side is placed flush against the component to be measured. If the appropriate bubble is located in the center of its vial, the component is properly oriented and can be secured. If the bubble is not in the center of the vial, the component must be moved until the bubble is centered and then the component can be secured.

The major drawback of the vertical or plumb level is that it takes at least one hand to hold the level flush against a vertical surface of the component while the component is being secured in place. Since it generally takes two hands to position and secure a component, a minimum of two people is needed, one person to hold the level against the component and the other to position and secure the component, which is an inefficient use of construction personnel. In addition, if the person holding the level is not diligent enough or becomes tired, one end of the level may come away from the component and show a false vertical reading, resulting in the component not being plumbed properly.

Although the horizontal level can be set on a horizontal surface of the component without being held, such conduct is not safe. If the component should slip or fall, the level could easily fall off the component, causing damage, especially to the level itself, or personal injury. Thus, the safest course is to hold the level in place while the component is being positioned and secured. As with the vertical level, since it generally takes two hands to position and secure a component, a minimum of two persons is needed, one to hold the level against the component and the other to position and secure the component, which is also an inefficient use of construction personnel.

Thus, there continues to be a need for a device that can properly and efficiently position and hold a level to a construction component, freeing both hands to safely position and secure the component and freeing one person to perform other tasks.

SUMMARY OF THE INVENTION

The level clamp of the present invention is intended to overcome the disadvantages inherent in using levels during construction. Generally, this level clamp comprises: (1) a body that has at least a cross wall and a pair of opposed side walls integrated with the cross wall; (2) a connector for joining the body with the level during operative engagement of the level with a construction element; (3) a pair of opposed jaws pivotally attached to the opposed side walls that clamp the construction element therebetween when the level and construction element are in operative engagement; and (4) an opening in the body for viewing the level's bubble when the body and the level are joined by the connector.

The preferred level clamp includes a body, a pair of jaws for temporarily gripping a construction component, and a means for temporarily attaching a level to the body. The body is an elongated metal or rigid plastic element with an inverted U-shaped cross-section. Optionally, the gap between the walls generally narrows with distance from the cross wall. Optionally, there are ribs that extend across the cross wall and down the side wall to give the body portions more rigidity. There is an opening in the center of the cross wall that extends down the side walls through which the level bubble is seen.

Preferably, the level is temporarily attached inside the body by mating microcatch patches or screws that extend through the cross wall or side walls and into the level.

The body has a pair of metal or plastic, pivotally mounted, opposed jaws, each jaw being mounted near the lower edge of one side wall and being substantially the same length as the body. Preferably, the lower edges of the jaws include a plurality of sharp pins to securely grip the component to which the level is being clamped. Optionally, the pins are replaceable and, optionally, the pins are screws that extend through holes in the jaws. Preferably, the upper portions of the jaws are adapted to be manually gripped. As the upper portions of the jaws are forced together, such as by manually squeezing the edges together, the lower edges separate. As the force on the upper portions is released, a plurality of springs forces the lower edges of the jaws toward each other.

BRIEF DESCRIPTION OF THE DRAWINGS

For a fuller understanding of the nature and object of the present invention, reference is made to the accompanying drawings, wherein:

3

Figure 1:
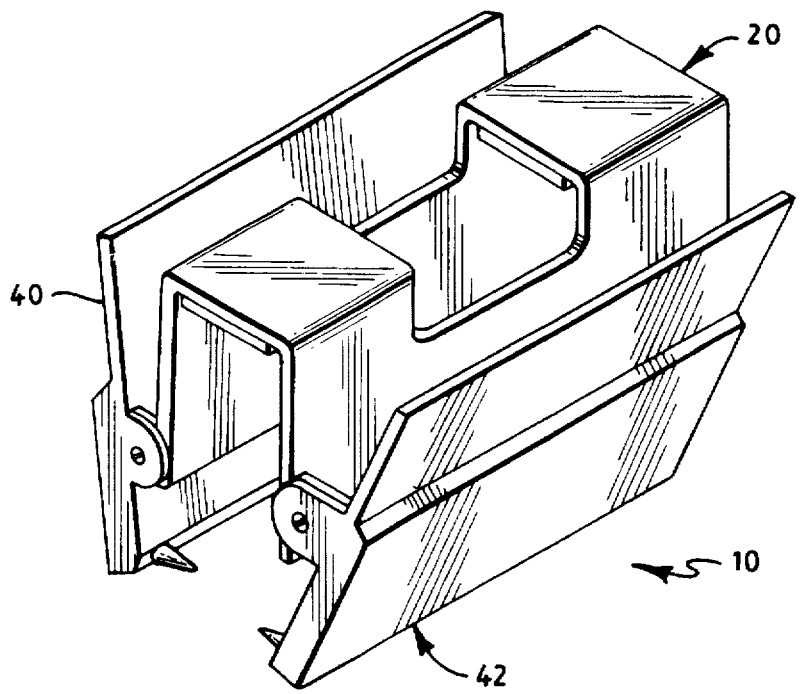
Figure 2:
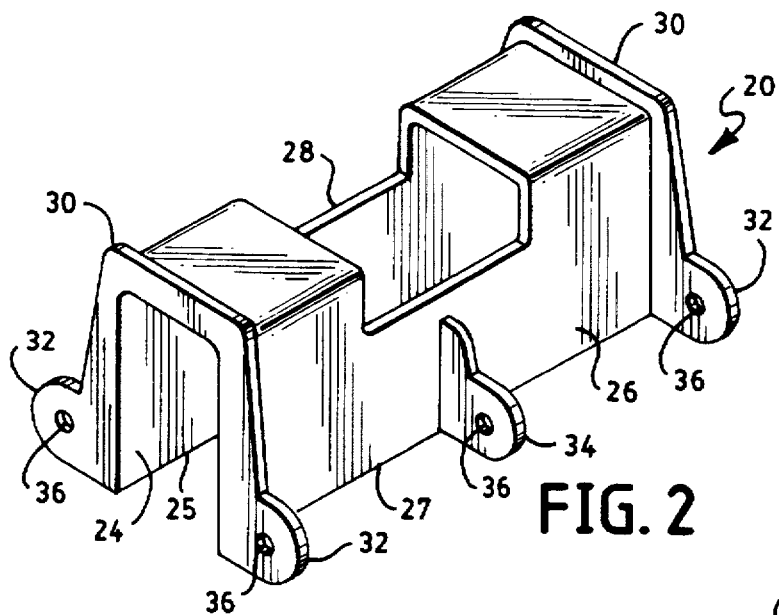
Figure 3:
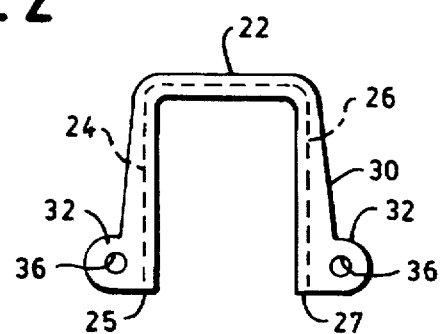
Figure 4:
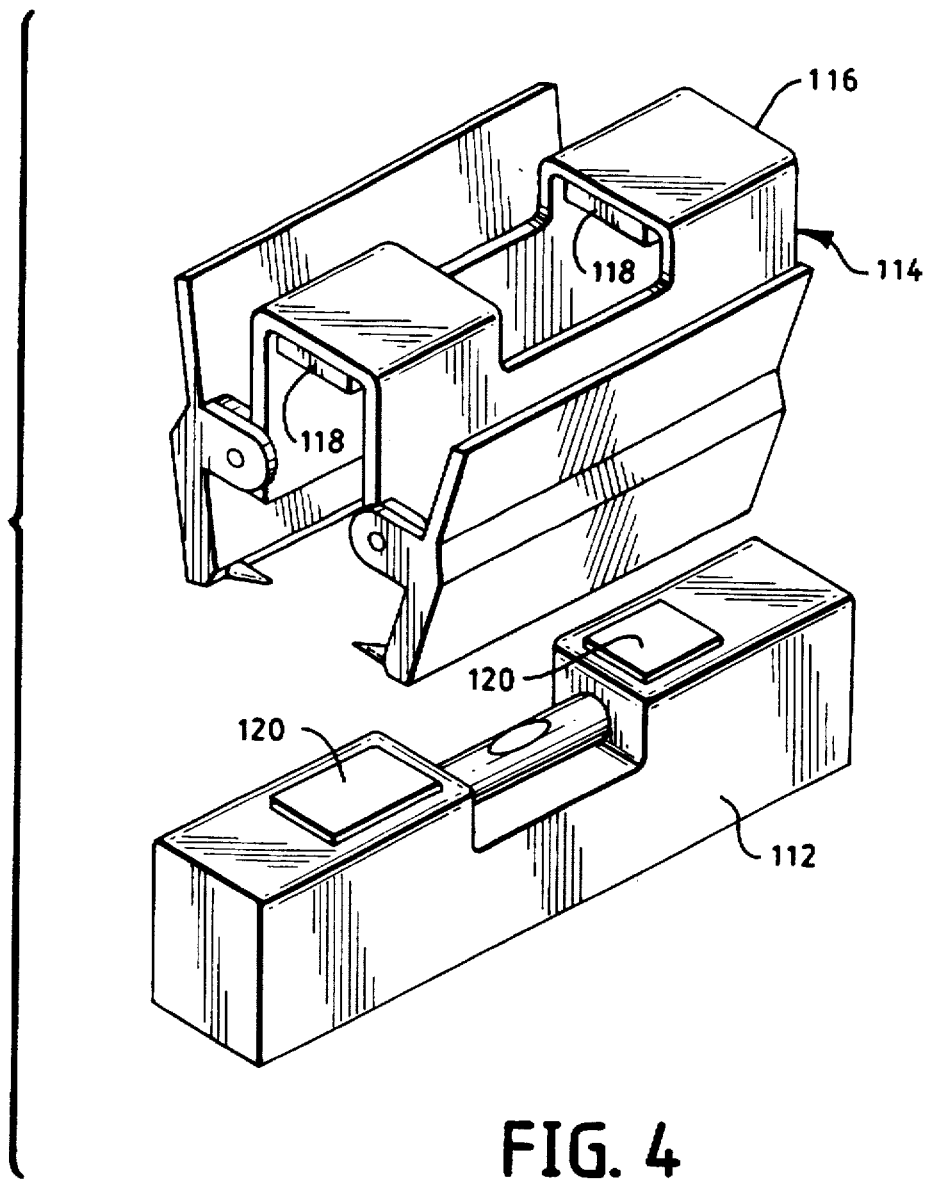
Figure 5:
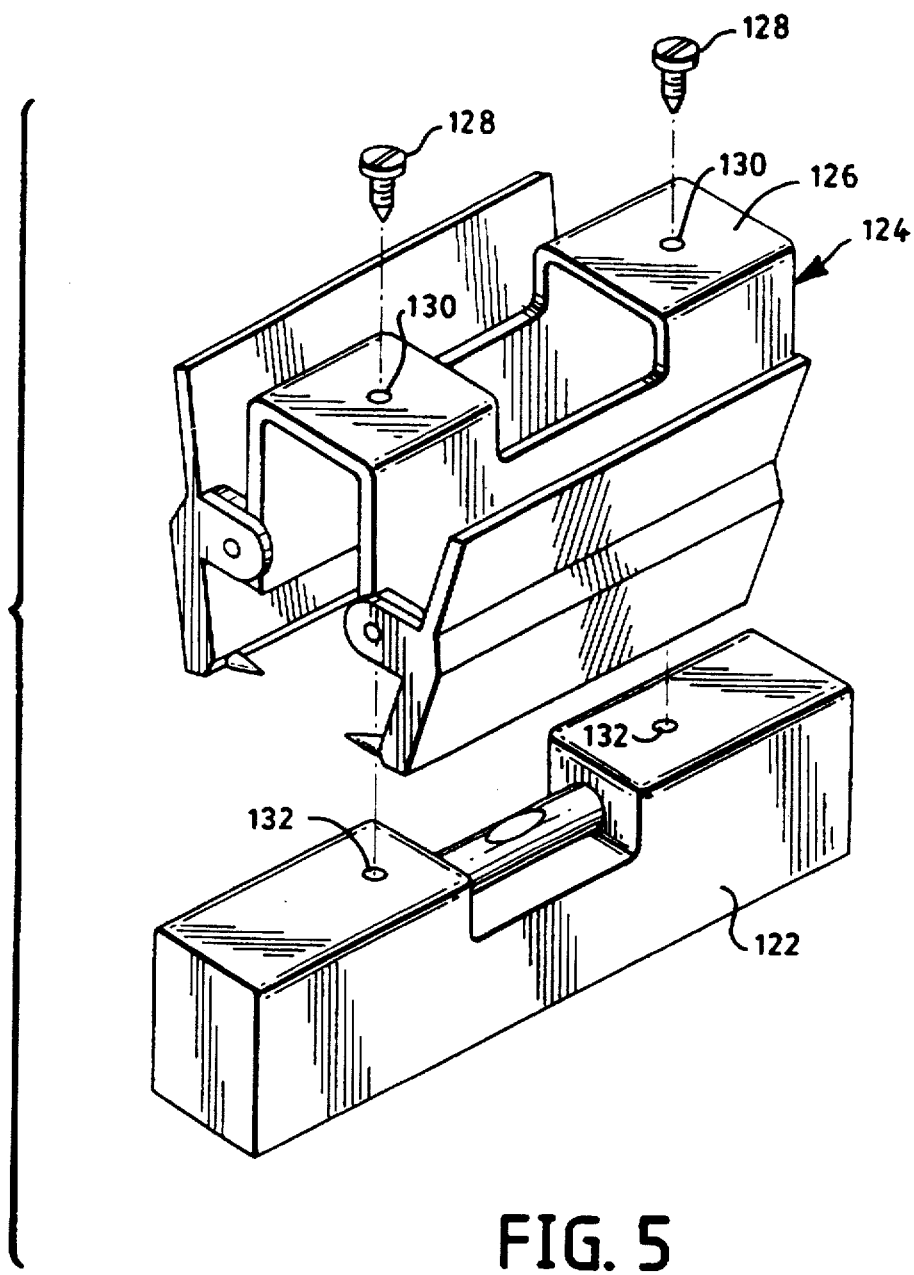
Figure 6:
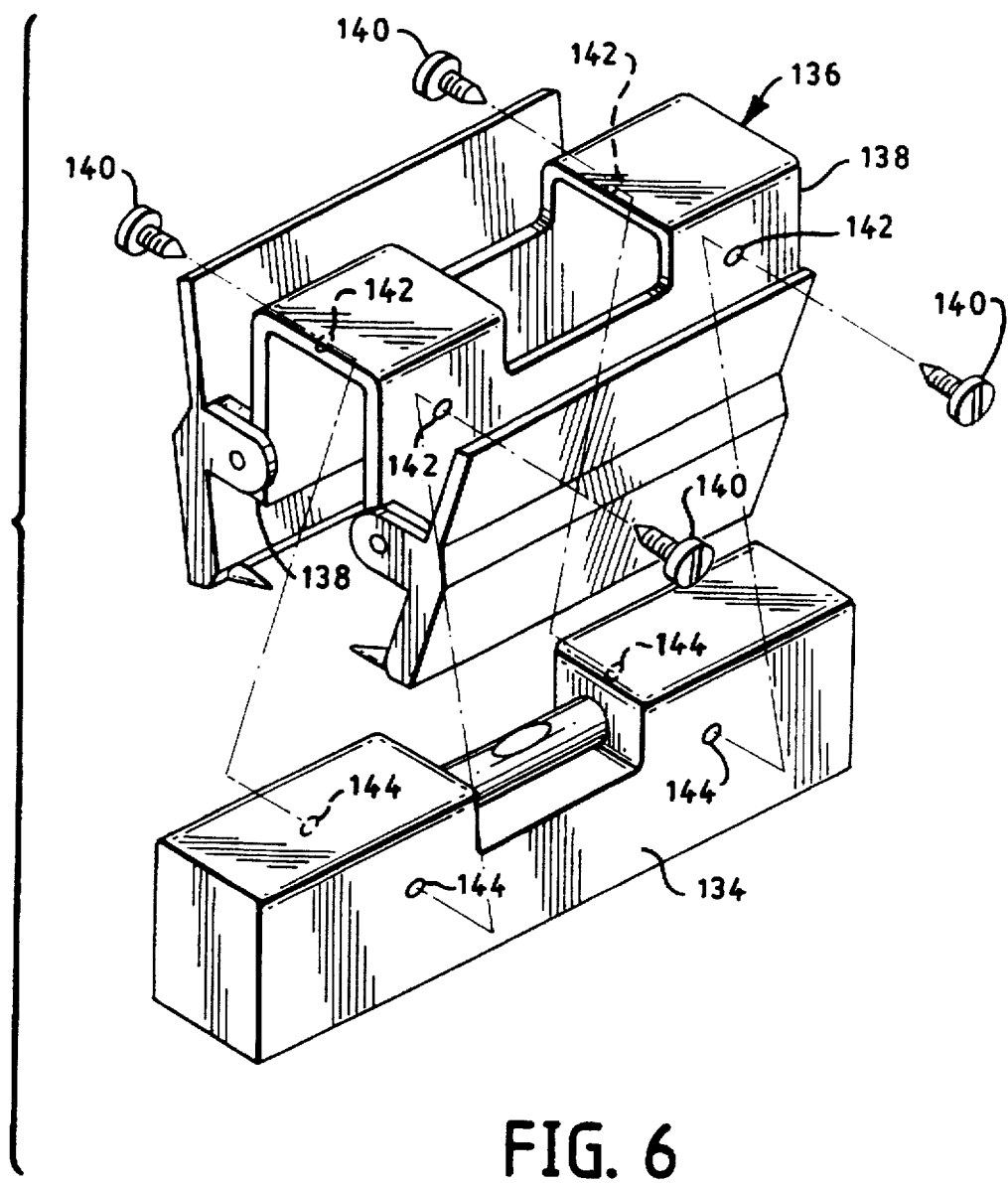

FIG. 1 is a perspective view of the level clamp of the present invention;

FIG. 2 is a perspective view of the body;

FIG. 3 is an end view of the body;

FIG. 4 is a perspective view of the microcatch method for connecting the level to the clamp;

FIG. 5 is a perspective view of the top screw method for connecting the level to the clamp;

FIG. 6 is a perspective view of the side screw method for connecting the level to the clamp;

FIG. 7 is a perspective view of a jaw;

FIG. 8 is a perspective, exploded view of an alternate pin configuration of the jaw;

FIG. 9 is a perspective, exploded view of another alternate pin configuration of the jaw;

FIG. 10 is a partial cross-sectional, exploded view of another alternate pin configuration of the jaw;

FIG. 11 is an exploded view of the assembly of one jaw to the body; and

Figure 12:
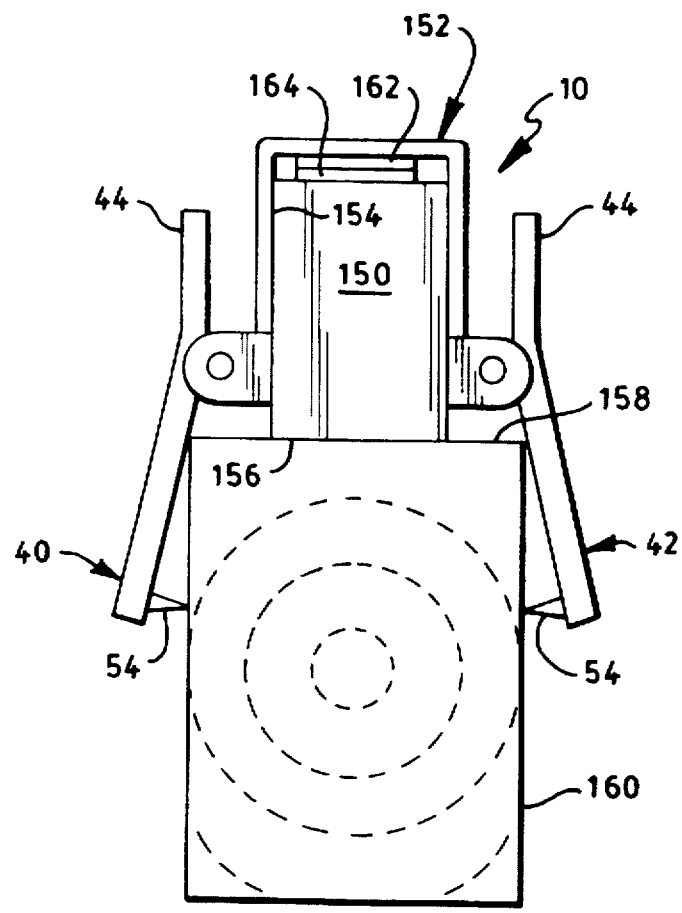

FIG. 12 is an end view of the operation of the level clamp.

DETAILED DESCRIPTION

As shown in FIG. 1, the preferred embodiment of the level clamp 10 includes a body 20 and a pair of jaws 40, 42.

The Body of FIGS. 2 and 3

The body 20, shown in FIGS. 2 and 3, is a single piece composed of either a formed sheet metal, such as steel, an extrusion of aluminum or rigid plastic, or a molded aluminum or rigid plastic. The preferred materials are acrylonitrile butadiene styrene resin (ABS plastic) or Lexan®. The body 20 includes a cross wall 22 and integral side walls 24, 26. The side walls 24, 26 extend downwardly approximately perpendicularly from the edges of the cross wall 22, forming an inverted U shape when viewed in cross section, as in FIG. 3. Optionally, the side walls 24, 26 slant inwardly so that the gap between the side walls 24, 26 is narrower at the edges 25, 27 of the side walls 24, 26 remote from the cross wall 22 than at the cross wall 22.

Preferably, the body 20 is between 4 inches and 5 inches long, between ¾ inch and 1¼ inches wide, and 1¾ inches and 2 inches high.

An opening 28 runs the entire width of the cross wall 22 and extends partway down the side walls 24, 26. The opening 28 permits the user to view the level bubble from various orientations.

Optionally, there are a pair of ribs 30, one near each end of the body 20, that extend across the cross wall 22 and down the side walls 24, 26. The ribs 30 impart rigidity to the walls 24, 26 so that they do not flex outwardly a significant amount when the clamp 10 is in use.

Extending substantially perpendicularly outward from each side wall 24, 26 is a trio of flanges 32, 34. Optionally, the outside two flanges 32 are extensions of the ribs 30. Through each flange 32, 34 is a substantially circular pivot hole 36. The holes 36 for each trio of flanges 32, 34 are axially aligned.

Methods for Attaching a Level to the Clamp of FIGS. 4–7

There are several preferred methods for attaching the level to a level clamp. When either a I-beam or box level is used, as shown in FIG. 4, a pair of microcatch patches 118 attached to the under surface of the cross wall 116 is used. These patches 118 mate with a pair of matching microcatch patches 120 attached to the upper surface of the level 112 and are used to removably attach the level 112 to the body 114.

4

In another configuration, shown in FIG. 5, either an I-beam or box level 122 is held to the body 124 by a plurality of screws 128 that extend through a plurality of holes 130 located in the cross wall 126 and that are turned into holes 132 in the top surface of the level 122. The holes 132 in the level can be threaded or not threaded. If they are not threaded, the screws 128 must be self-tapping so that they hold the level 122 to the body 124.

In a third configuration, shown in FIG. 6, a box level 134 is held to the body 136 by a plurality of screws 140 that extend through a plurality of holes 142 located in the side walls 138 and that are turned into holes 144 in the sides of the level 134. The holes 142 in the level can be threaded or not threaded. If they are not threaded, the screws 140 must be self-tapping so that they hold the level 134 to the body 136. With this configuration, ribs are not needed to keep the side walls 138 from flexing outwardly, since the screws 140 perform the same function in addition to holding the level 134 to the body 136.

As an adjunct to the above-described configurations, optionally, the side walls 24, 26 are designed such that the gap between them is narrower at the edges 25, 27 of the side walls 24, 26 remote from the cross wall 22 than at the cross wall 22. This narrowing provides a gripping action to more securely hold the level to the body 20 when positioning the level in the body 20 before any of the above-described attachment configurations can be employed.

Any combination of the above-described configurations may be included in any particular embodiment of the clamp. For example, one embodiment of the clamp may include microcatch patches 172, holes 184 in the cross wall, and holes 266 in the side walls. The various combinations of attachment configurations allow the user to select the method for attaching the level to the clamp that is appropriate for the situation.

The Jaws of FIGS. 7–11

One of the pair of jaws 40 is shown in FIG. 7, and the other jaw 42 is the mirror image of the first jaw 40. Preferably, the jaws 40, 42 are approximately planar, and include an upper portion 44 and a lower portion 46. The jaws 40, 42 are approximately the same length as the body 74 and approximately 1½ times the height of the side walls 24, 26.

Extending substantially perpendicularly from the jaw 40, 42 between the upper portion 44 and lower portion 46 are a trio of mounting ears 48, 50. Each ear 48, 50 has a substantially circular pivot hole 52, where all three holes 52 are axially aligned and have about the same diameter as the body pivot holes 76.

The upper portions 44 of both jaws are adapted to be easily gripped by one hand when the jaws 40, 42 are connected to the body 74, as described below. A plurality of pins 54 extend approximately perpendicularly from the inner surface 56 adjacent to the lower edge 58 of the lower portion 46. Preferably there are two pins 54, one near each end of the jaw 40. The pins 54 allow the jaws 40, 42 to securely grip the construction element to which the level is being clamped. In one configuration, the pins 54 are integrally formed with the jaw 40. In another configuration, shown in FIG. 8, the pins 80 are manufactured separately such that the pin barrel 82 is slightly larger than the hole 84 into which the barrel 82 is inserted. The barrel 122 is forced into the hole 124 and is held in place by the size differential. In a third configuration, shown in FIG. 9, the pins 86 are manufactured separately such that the pin barrel 88 is threaded. The jaw hole 90 is also threaded and the threaded barrel 88 is screwed into the threaded jaw hole 90. In a fourth configuration, shown in FIG. 10 in partial cross-section, the pins are standard screws 92. The screws 92 are screwed into holes 94 through the jaw 40 near the lower edge 58 until the points 96 extend beyond the jaw inner surface 56. This last configuration enables the user to replace the pins 92 with commonly available screws when they wear out, rather than having to purchase special pins from the manufacturer of the clamp.

As shown in FIG. 11, each jaw 40, 42 is pivotally mounted to the body 74 via the body pivot holes 76 and jaw pivot holes 52 such that the pins 54 point toward each other and the holes 76, 52 are axially aligned. A pair of springs 60 is associated with each jaw 40, 42. Each spring 60 has a coil 62 from which the ends of the coil 64, 66 tangentially extend, forming a V-shape in cross-section, with the coil 62 at the apex. A shaft 68 extends through the holes 76, 52 and the spring coils 62, where one spring is located on each side of the center ears 34, 50. A head 70 on one end of the shaft 68 and a flattened portion at the other end 72 of the shaft 68 precludes the shaft 68 from being removed from the holes 76, 52 and spring coils 62. Alternatively, the ends of the shaft 246 may both be flattened or expanded. The springs 60 are oriented such that the upper portion 44 of the jaw 40, 42 is biased away from the body 74, forcing the pins 54 toward the pins of the other jaw.

In another configuration for pivotally mounting the jaws to the body, there are only two ears on each jaw, a like number of flanges on the body side wall, and one spring for each jaw.

OPERATION

FIG. 12 shows that operation of the present invention with a box level 150. The height of the level 150 is necessarily greater than the height of the inner surface 154 of the body 152 so that the reference surface of the level 156 will make contact with the surface 158 of the construction element 160.

In operation, the clamp 10 is first placed over the level 150. If microcatch patches 162, 164 are used, as in FIG. 12, the patches 162, 164 mate and adhere to each other. If screws are used, the screws are turned into the holes in the level.

The jaws 40, 42 are opened by gripping with the hand around the upper portion 44 of both jaws 40, 42 and applying pressure by closing the hand. When the pins 54 are far enough apart to fit around the construction element 160 to which the level 150 is being attached, the jaws 40, 42 are placed on either side of the construction element 160, making sure that the reference side of the level 156 is flush to the surface 158 of the construction element 160. The manual pressure is released and the pins 54 hold the level 150 against the construction element surface 158. If the pins 54 are angled slightly upward toward the level, as they typically will be, the pins 54 will pull the level 150 more securely against the construction element surface 158, making the level reading more accurate.

To remove the level 150, the procedure is reversed.

What is claimed is:

1. A clamp for temporarily holding a level against an elongated construction element having a straight edge to be predeterminedly oriented, said level including at least a straight edge and at least a bubble geometrically related thereto, said clamp comprising:

(a) a body having at least a cross wall and a pair of opposed side walls integrated with said cross wall, said cross wall having an inner surface and an outer surface and each of said sides walls having an inner surface, an outer surface and a remote edge distant from said cross wall;

(b) a connector for joining said body with said level during operative engagement of said level with said construction element;

(c) a pair of opposed jaws pivotally attached to said opposed side walls, each of said jaws having an upper portion adapted to be manually gripped and a lower portion with a lower edge having a plurality of pins projecting inwardly therefrom, said pivotal attachment including at least one spring for biasing said lower edges toward each other;

(d) said jaws clamping said construction element therebetween when said level and said construction element are in said operative engagement; and (e) said body having an opening for display of said bubble when said body and said level are joined by said connector.

2. The clamp of claim 1 wherein the distance between said side wall inner surfaces is greater at said cross walls than at said remote edges.

3. The clamp of claim 1 wherein said body has at least a rib extending across said cross wall outer surface and down both of said side wall outer surfaces.

4. The clamp of claim 1 wherein said connector for joining said body with said level includes at least one microcatch patch attached to said cross wall inner surface and a mating microcatch patch attached to said level.

5. The clamp of claim 1 wherein said connector for joining said body with said level includes at least a through hole in said body, a like number of screws, and at least a like number of level holes in said level, whereby said screw is inserted into said through hole and turned into said level hole.

6. The clamp of claim 1 wherein said pins are replaceable.

7. The clamp of claim 1 wherein said pivotal attachment includes at least two flanges extending outwardly substantially perpendicularly from each of said side walls, a flange hole in each of said flanges, at least two ears extending substantially perpendicularly from each of said jaws, and an ear hole in each of said ears, said flange holes of one of said side walls and said ear holes of one of said jaws being axially aligned, and a shaft extending through said flange holes and said ear holes.

8. A clamp for temporarily holding a level against an elongated construction element having a straight edge to be predeterminedly oriented, said level including at least a straight edge and at least a bubble geometrically related thereto, said clamp comprising:

(a) a body having at least a cross wall and a pair of opposed side walls integrated with said cross wall, said cross wall having an inner surface and an outer surface and each of said sides walls having an inner surface, an outer surface and a remote edge distant from said cross wall;

(b) a connector for joining said body with said level during operative engagement of said level with said construction element;

(c) a pair of opposed jaws pivotally attached to said opposed side walls, each of said jaws having an upper portion adapted to be manually gripped and a lower portion with a lower edge having a plurality of replaceable pins projecting inwardly therefrom, said pivotal attachment including at least one spring for biasing said lower edges toward each other, at least two flanges extending outwardly substantially perpendicularly from each of said side walls, a flange hole in each of said flanges, at least two ears extending substantially perpendicularly from each of said jaws, and an ear hole in each of said ears, said flange holes of one of said side walls and said ear holes of one of said jaws being axially aligned, and a shaft extending through said flange holes and said ear holes;

(d) said jaws clamping said construction element therebetween when said level and said construction element are in said operative engagement; and (e) said body having an opening for display of said bubble when said body and said level are joined by said connector.

9. The clamp of claim 8 wherein the distance between said side wall inner surfaces is greater at said cross walls than at said remote edges.

10. The clamp of claim 8 wherein said body has at least a rib extending across said cross wall outer surface and down both of said side wall outer surfaces.

11. The clamp of claim 8 wherein said connector for joining said body with said level includes at least one microcatch patch attached to said cross wall inner surface and a mating microcatch patch attached to said level.

12. The clamp of claim 8 wherein said connector for joining said body with said level includes at least a through hole in said body, a like number of screws, and at least a like number of level holes in said level, whereby said screw is inserted into said through hole and turned into said level hole.

* * * * *